Nov. 3, 1925.

J. L. BOSKET

SHAFT COUPLING

Filed Sept. 29, 1922

1,559,546

Inventor
Jesse L. Bosket
By Alexander Dowell
Attorneys.

Patented Nov. 3, 1925.

1,559,546

UNITED STATES PATENT OFFICE.

JESSE L. BOSKET, OF BINGHAMTON, NEW YORK.

SHAFT COUPLING.

Application filed September 29, 1922. Serial No. 591,409.

*To all whom it may concern:*

Be it known that I, JESSE L. BOSKET, a citizen of the United States, residing at Binghamton, in the county of Broome and State of New York, have invented certain new and useful Improvements in Shaft Couplings; and I hereby declare that the following is a full, clear, and exact description thereof, reference being had to the accompanying drawings, which form part of this specification.

This invention is a novel shaft coupling, particularly designed for connecting together the abutting ends of aligned shafts of the same, or of different, diameters, without having to disalign either shaft, or remove it from its bearings; said coupling also enables the shafts to be readily connected or disconnected at any time, as desired.

The object of the invention is to provide a shaft coupling simple in construction and of great strength, which will insure perfect alignment of the coupled shafts, can be readily and easily assembled or disassembled, applied or detached, and which can be readily adapted to couple aligned shafts of different diameters, by using keys of suitable cross section.

I will explain the invention with reference to the accompanying drawings which illustrate one practical embodiment thereof, to enable others familiar with the art to adopt and use the same, and will summarize in the claims the novel features of construction, and novel combinations of parts, for which protection is desired.

As shown, the coupling comprises two opposite and complemental members 1 which are constructed alike, and are preferably approximately semi-circular in cross section; so that when assembled they form an approximately cylindric body around the shaft. The particular exterior form of the members, however, is immaterial. Each member 1 is provided on its inner face with a longitudinal groove $1^a$, which is preferably rectangular in cross section, and of a width slightly greater than the diameter of the largest shaft on which the coupling is to be used, and of a depth slightly less than the radius of such shaft. The members 1 are provided exteriorly to the groove with opposed perforations $1^b$, adapted to receive bolts 2 provided with nuts $2^a$ for drawing the members 1 together. The members 1 are preferably flanged, or provided with recesses $1^c$ at the outer ends of the perforations $1^b$ for the accommodation of the bolt-heads and of the nuts $2^a$, such bolt-heads and nuts lying entirely within the outer circumference of the members 1, so that they will not catch extraneous objects when the coupling is rotating.

In the corners of the grooves $1^a$ of both members 1 are placed keys 3, which are preferably square in cross section, and fitted neatly in the corners of the grooves $1^a$. These keys 3 are of such size that when the members 1 with the keys 3 are assembled around the shafts S, S', as shown, the inner corner edges of said keys will bite into the periphery of the shaft sections S, S', as shown, and when the members of the coupling are drawn together by tightening the bolts 2, the keys 3, biting into the shafts S, S', will securely bind the shafts together.

Figure 1:
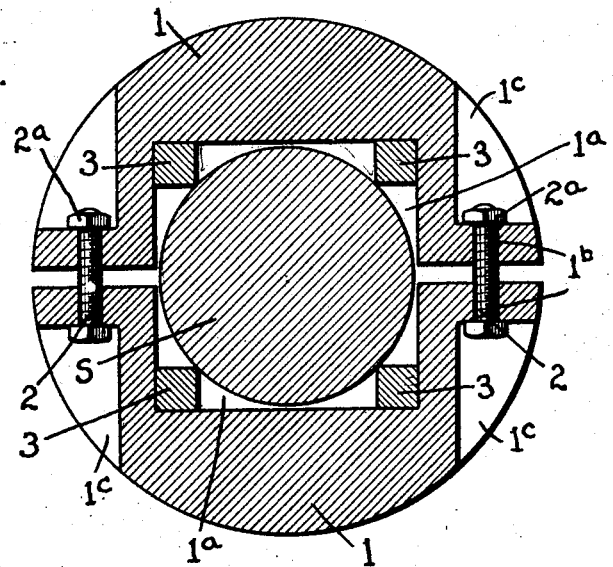
Fig. 1 is a transverse section through the shaft and coupling.
Figure 2:
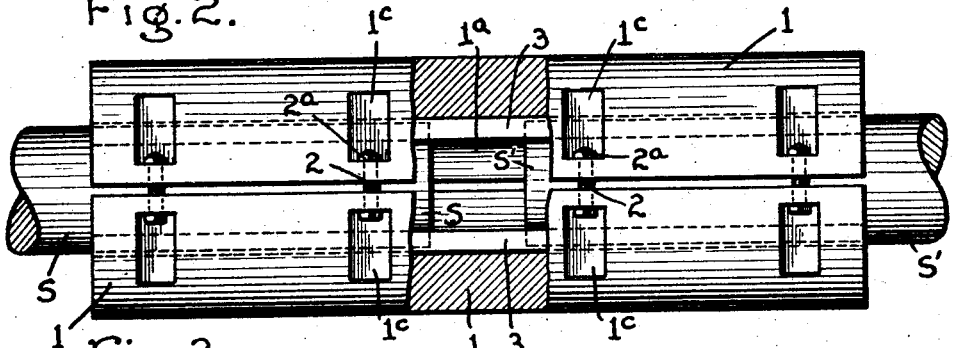
Fig. 2 is a side view thereof, partly broken away.
Figure 3:
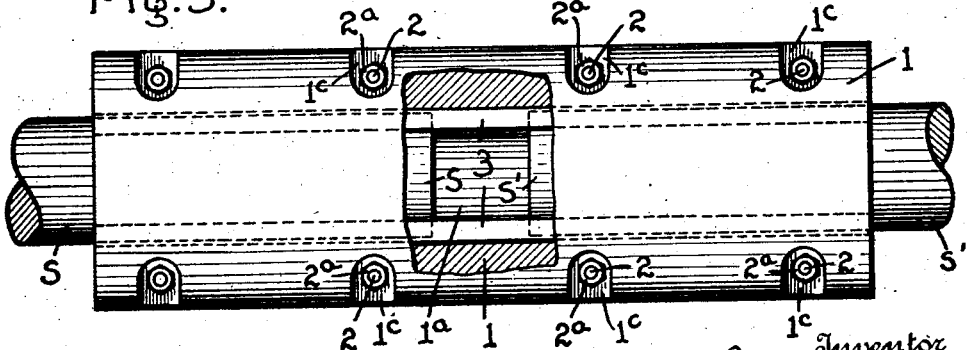
Fig. 3 is a plan view thereof, partly broken away.

When the coupling is applied to aligned similar shaft sections S, S', as indicated in Figs. 2, 3, the shaft sections will be caused to rotate together and the sections will be held firmly and securely in axial alignment.

In assembling one half of the coupling is placed underneath the ends of the shafts to be coupled, with square keys of highly tempered steel in each corner of the rectangular slot, said keys being of such size that the inner corner thereof will touch the outer surface of the shaft when the two parts of the coupling are slightly separated. The other half of the coupling is then similarly placed over the ends of the shaft and the two halves of the coupling are then drawn together by bolts, causing the corners of the square keys in each corner of the square hole to press firmly against the surfaces of the shafts to be coupled.

In assembling the common forms of couplings it is necessary to raise or lower the end of one of the aligned shafts in order that the parts of the coupling, and the sleeve may be slipped thereon. Moreover, great skill is required in bolting the common forms of couplings together, so as not to throw the shafts out of alignment. Also in order to dismantle said couplings it is usually necessary to separate the parts of the coupling with a chisel or wedge, and then drive the sleeve off the shaft, necessitating the raising or lowering of the end of one of the shafts, to permit the coupling sleeve to be slipped off. But, in assembling my novel coupling, all that is necessary is to place the members 1 of the coupling upon opposite sides of the aligned shafts S, S', place the bolts 2 in the holes 1ᵇ, and slip the keys 3 into their proper positions in the grooves 1ᵃ, and then tighten the bolts 2, which operations can be performed without disturbing the alignment of the shafts in any way.

The usual form of shaft coupling for heavy work is the so-called compress coupling, comprising two cylindrical portions adapted to be placed end to end and having a hole through the centers thereof into which a sleeve is inserted. The two cylindrical portions are bored to taper off toward the inner ends, and are so made that they may be drawn together by means of bolts disposed parallel to the shafts. This form of coupling is of sufficient strength for ordinary shafting which has a rotating motion in one direction only. Such couplings, however, have not been found to be of sufficient strength for a shaft which has a motion first in one direction and then in the reverse direction, or for an oscillating motion, such as used for the rocker arms in tanneries, and the like.

In practical use, my novel coupling on a $2\frac{7}{16}''$ shaft has stood effectively strains which have broken the strongest couplings of the usual form, and which at times have been so great as to burst the shaft.

By using two different sizes of keys 3 in opposite ends of the same coupling, shafts of different diameters may be coupled together. This is a great advantage as the same size coupling may be used for coupling different sizes of aligned shafts. Furthermore, this invention will enable shaft sections S, S' of equal but varying diameters to be also coupled together by using keys 3 of varying sizes according to the diameter of the shafts.

What I claim is:

1. A shaft coupling, comprising two complemental members adapted to surround the abutting ends of two aligned shafts, each member having an angular longitudinal groove in its inner face of greater width than the diameters of the shafts, and adapted to loosely receive the shafts; means for forcibly drawing the members together; angular changeable keys adapted to be placed in the angles of said grooves, and when so placed one of the angular portions of each of said keys being adapted to engage the related angle of said groove, and another angular edge of each key to bite the shafts when said members are drawn together, substantially as described.

2. A coupling for aligned shafts comprising two opposite similar complemental members substantially semi-circular in cross section, adapted together to form a substantially cylindric body, each member having a rectangular groove in its inner face slightly greater in width than the diameter of the largest shaft on which the coupling is to be used, and slightly less in depth than the radius of said shaft, said members having holes outside said grooves; bolts engaging said holes for drawing the members together; and rectangular keys adapted to fit in the corners of said grooves whereby two faces of each of said keys will engage the walls of said grooves, the inner edges of said keys being adapted to bite the shafts when said members are drawn together, substantially as described.

In testimony that I claim the foregoing as my own I affix my signature.

JESSE L. BOSKET.